C. L. & Z. R. GREEN.
VEHICLE TOP RAISER.
APPLICATION FILED MAY 24, 1913.
1,090,913.
Patented Mar. 24, 1914.
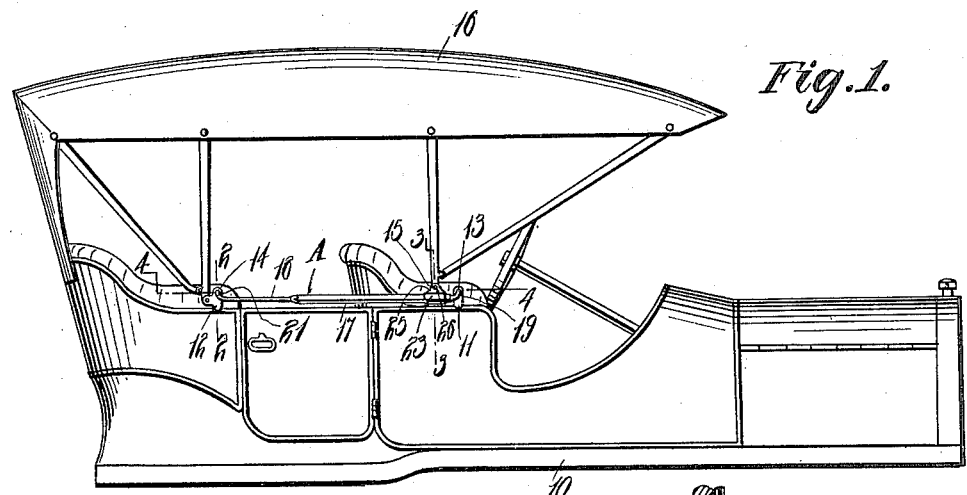
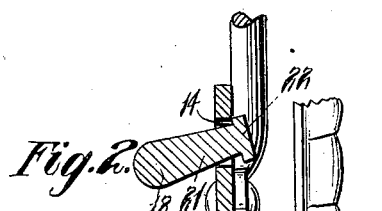
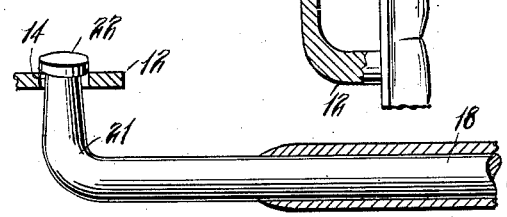
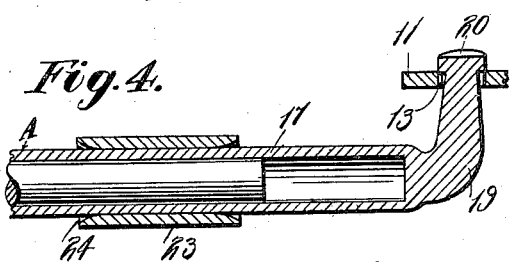
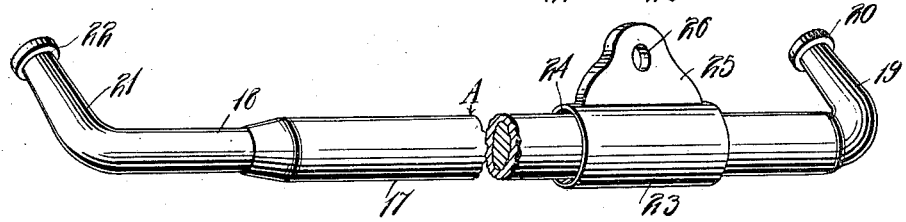
Witnesses
W. C. Fielding
R. B. Cavanagh
Inventors
C. L. Green
and Z. R. Green,
Henry T. Bright
Attorney

UNITED STATES PATENT OFFICE.

CLARENCE L. GREEN AND ZACK R. GREEN, OF PRESCOTT, ARKANSAS.

VEHICLE TOP-RAISER.

1,090,913.  Specification of Letters Patent.  Patented Mar. 24, 1914.

Application filed May 24, 1913.  Serial No. 769,550.

*To all whom it may concern:*

Be it known that we, CLARENCE L. GREEN and ZACK R. GREEN, citizens of the United States, residing at Prescott, in the county of Nevada and State of Arkansas, have invented certain new and useful Improvements in Vehicle Top-Raisers; and we do hereby declare the following to be a full, clear, and exact description of the invention, such as will enable others skilled in the art to which it appertains to make and use the same.

This invention relates to devices for facilitating the raising and lowering of vehicle tops.

The object of the invention resides in the provision of a device of the character named which will prove an efficient aid in raising and lowering tops of vehicles and has particular adaptability to aid in raising and lowering the tops of automobiles.

A further object of the invention resides in the provision of a device of the type named which will be simple in construction, efficient in use, easily applied and removed to and from the automobile, adapted to be stored in a relatively small space, and which may be manufactured at a comparatively small cost.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a side view of a portion of an automobile showing the invention applied for raising or lowering the top; Fig. 2, an enlarged section on the line 2—2 of Fig. 1; Fig. 3, an enlarged section on the line 3—3 of Fig. 1; Fig. 4, an enlarged section on the line 4—4 of Fig. 1, and Fig. 5, a detail perspective view of the device detached.

Referring to the drawings 10 indicates the body of an automobile which has mounted thereon the usual front and rear top irons 11 and 12 respectively. These top irons 11 and 12 are provided respectively with openings 13 and 14 adapted to detachably receive the socket pin 15 of the advance bow of the automobile top, which latter is indicated at 16.

The device for facilitating the raising and lowering of the top 16 is shown as comprising a bar A including telescoping sections 17 and 18 whereby said bar may be lengthened and shortened to conform to the distance between the front and rear top irons of various makes of automobiles. The outer end of the section 17 terminates in a laterally directed portion 19 which is tapered a predetermined distance in the direction of its free end to form a shoulder 20. Likewise the outer end of the section 18 terminates in a laterally directed portion 21 which is also tapered a predetermined distance toward its free end to form a shoulder 22. The inner end of the section 17 is also tapered toward the section 18 for a purpose that will presently appear. Slidably mounted upon the bar A is a sleeve 23 the bore of which is flared at each end as at 24 so that free sliding movement of the sleeve in one direction over the end of the section 17 will be assured, it being noted that the taper of the inner end of the section 17 also aids in securing an unimpeded sliding movement of the sleeve 23. Formed on the sleeve 23 is a laterally directed ear 25 provided with an opening 26 adapted to detachably receive the socket pin 15 of the top bow.

In the use of the device the socket pin 15 is first withdrawn from the opening 14 of the rear top iron 12. The laterally directed portions 19 and 21 of the bar A are then engaged through the openings 13 and 14 respectively. The bar A is then released and as the diameter of the laterally directed portions 19 and 21 is slightly less than the diameter of respective openings 13 and 14 the weight of the bar will cause said laterally directed portions to assume a position at an angle to the longitudinal axes of respective openings 13 and 14 which will result in the shoulders 20 and 22 engaging against the inner sides of respective top irons 11 and 12 and in this manner the bar is secured against disengagement from the top iron without the necessity of using any independent fastening devices. The socket pin 15 is then engaged in the opening 26 of the ear 25 and with the parts in this position the top can be raised without undue exertion as same is supported and guided in an efficient manner by the sleeve 23. After the top has been fully raised the socket pin 15 is withdrawn from the opening 26, the laterally directed portion 19 withdrawn from the opening 13 and the socket pin 15 applied in the opening 13. The bar A is then entirely removed, collapsed and stored in a convenient place until again called into use. By reversing the operation just described it will be obvious that the top 16 can be lowered with facility.

While the use of one bar A has only been illustrated and described it will be apparent that two such bars can be employed if desired by applying same to opposite sides of the automobile body.

What we claim is:—

1. A device for facilitating the raising and lowering of vehicle tops comprising a bar having portions adapted respectively for insertion through socketed members carried by a vehicle, shoulders on said portions engageable with the inner sides of respective members when said bar is released and moves downward by gravity, and a carrier slidably mounted on the bar and having means for connection with a bow of a vehicle top.

2. A device for facilitating the raising and lowering of vehicle tops comprising an extensible rod having portions adapted respectively for insertion through socketed members carried by a vehicle, shoulders on said portions engageable with the inner sides of respective members when said bar is released and moves downward by gravity, and a carrier slidably mounted on the bar and having means for connection with a bow of a vehicle top.

3. A device for facilitating the raising and lowering of vehicle tops comprising two slidably connected sections each of which has formed integral therewith a projecting portion adapted for insertion through the bow socket pin opening of a top iron of a vehicle, a shoulder formed on each projecting portion for engagement with the inner side of the top iron to hold said projecting portion against disengagement from the top iron, and a carrier slidably mounted on said sections and having means for connection with the bow of a vehicle top.

4. A device for facilitating the raising and lowering of vehicle tops comprising a bar formed of telescoping sections, the limiting sections of said bar having integral portions adapted to project through the bow socket pin openings of and detachably interlock with respective top irons of a vehicle, and means slidable on the bar for supporting the bow of a vehicle top.

5. A device for facilitating the raising and lowering of vehicle tops comprising a bar formed of telescoping sections, the limiting sections of said bar having their outer ends terminating in laterally directed portions adapted for engagement in the openings of the front and rear top irons of a vehicle respectively, said laterally directed portions being of less diameter than the openings of the top irons and provided respectively with shoulders adapted to engage the inner sides of the top irons when the laterally directed portions are disposed at an angle to the longitudinal axes of the openings whereby the bar is held against disengagement from the top irons, and a carrier slidably mounted on said bar and having means for connection with the bow of a vehicle top.

6. A device for facilitating the raising and lowering of vehicle tops comprising a bar terminating at each end in laterally directed portions adapted for engagement in the openings of the front and rear top irons of a vehicle respectively, said laterally directed portions being of less diameter than the openings of the top irons and provided respectively with shoulders adapted to engage the inner sides of the top irons when the laterally directed portions are disposed at an angle to the longitudinal axes of the openings whereby the bar is held against disengagement from the top irons, and a carrier slidably mounted on said bar and having means for connection with the bow of a vehicle top.

In testimony whereof, we affix our signatures, in the presence of two witnesses.

CLARENCE L. GREEN.
ZACK R. GREEN.

Witnesses:
W. H. TERRY,
C. H. GILMORE.

Copies of this patent may be obtained for five cents each, by addressing the "Commissioner of Patents. Washington, D. C."